S. J. FOREMAN.

Improvement in Whiffletree-Hooks.

No. 126,281.

Patented April 30, 1872.

Witnesses:

Inventor:

UNITED STATES PATENT OFFICE.

STANTON J. FOREMAN, OF NOTTAWA, (MENDON P. O.,) MICHIGAN, ASSIGNOR TO HIMSELF, JOHN S. WEEKS, AND ZEBBOATH OMANS.

IMPROVEMENT IN WHIFFLETREE-HOOKS.

Specification forming part of Letters Patent No. 126,281, dated April 30, 1872.

SPECIFICATION.

I, STANTON J. FOREMAN, of Nottawa, (Mendon P. O.,) in the county of St. Joseph, State of Michigan, have invented certain Improvements in Whiffletree-Hooks, of which the following is a specification:

*Nature and Object of the Invention.*

My invention consists in the construction of a whiffletree-hook in such a shape that it is impossible for the cockeye of the trace to accidentally unhook when the trace is slacked, and the whiffletree inclines downward, as in backing, descending a hill, and plowing; also that it will fit any size cockeye.

*Description of Accompanying Drawing.*

Figure 1:
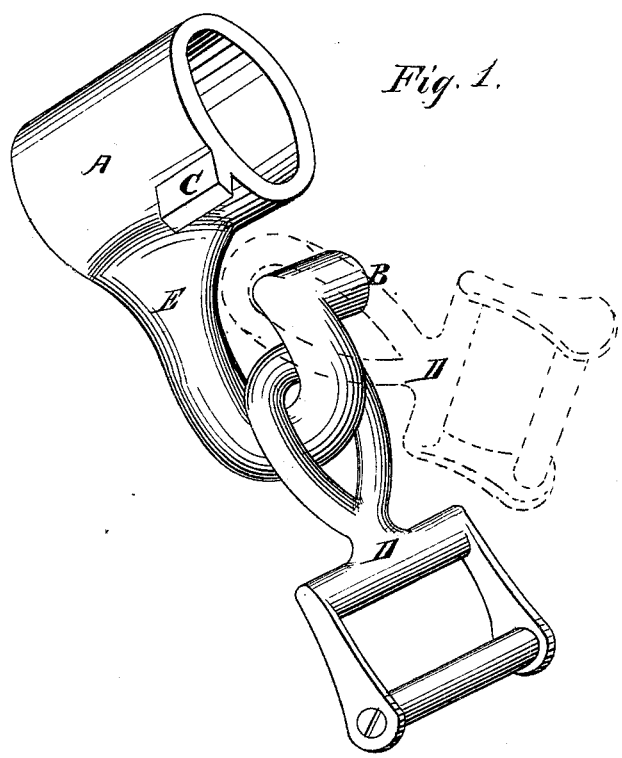
Figure 2:
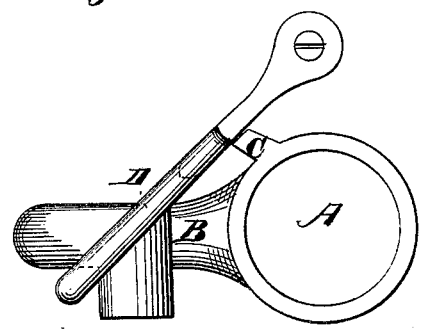

Figure 1, perspective view. Fig. 2 is a side elevation, showing the use of the projecting bar C.

*General Description.*

Like letters indicate like parts.
A, in Fig. 1, is the ferrule into which whiffletree is inserted. E is the hook or projecting-arm. D is the cockeye. The dotted part D shows the position of the cockeye when being hooked on. B shows the stud or spur on the projecting arm E. C is a projecting bar to prevent the cockeye from unhooking when thrown back, as shown in Fig. 2.

The stud or spur B is so formed that when the trace is slackened the whiffletree drops down, thereby turning the point of the hook or projecting arm back, making it impossible to accidentally unhook.

*Claim.*

I claim as my invention—

The stud or spur B on the projecting arm E, and the projecting bar C on the ferule A, substantially as and for the purposes hereinbefore set forth.

STANTON J. FOREMAN.

Witnesses:
   ELISHA DOANE,
   I. J. McCLELLAN.